US012117137B2

(12) United States Patent
Qiu et al.

(10) Patent No.: US 12,117,137 B2
(45) Date of Patent: Oct. 15, 2024

(54) LOW-BEAM PRIMARY OPTICAL ELEMENT, VEHICLE LAMP MODULE, VEHICLE LAMP, AND VEHICLE

(71) Applicant: HASCO VISION TECHNOLOGY CO., LTD., Shanghai (CN)

(72) Inventors: Zhiping Qiu, Shanghai (CN); Weigang Gong, Shanghai (CN); He Zhu, Shanghai (CN); Wenhui Sang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 226 days.

(21) Appl. No.: 17/799,099

(22) PCT Filed: Feb. 5, 2021

(86) PCT No.: PCT/CN2021/075608
§ 371 (c)(1),
(2) Date: Aug. 11, 2022

(87) PCT Pub. No.: WO2021/184997
PCT Pub. Date: Sep. 23, 2021

(65) Prior Publication Data
US 2023/0070547 A1 Mar. 9, 2023

(30) Foreign Application Priority Data
Mar. 20, 2020 (CN) ......................... 202010202394.4

(51) Int. Cl.
*F21S 41/24* (2018.01)
*F21S 41/25* (2018.01)
*F21W 102/135* (2018.01)

(52) U.S. Cl.
CPC ............... *F21S 41/24* (2018.01); *F21S 41/25* (2018.01); *F21W 2102/135* (2018.01)

(58) Field of Classification Search
CPC ..... F21S 41/24; F21S 41/25; F21W 2102/135
See application file for complete search history.

(56) References Cited

U.S. PATENT DOCUMENTS

2016/0053967 A1 2/2016 Owada
2019/0017670 A1* 1/2019 Zhu ......................... F21S 41/24
2020/0011501 A1* 1/2020 Kunii ........................ F21V 7/22

FOREIGN PATENT DOCUMENTS

CN 105066062 A 11/2015
CN 106439672 A 2/2017
(Continued)

OTHER PUBLICATIONS

Shanghai Institute of Automotive Lighting (2007) "Motor vehicle headlamps equipped with filament lamps" (GB 4599-2007 (GB4599-2007)) National Automotive Standardization Technical Committee, https://www.chinesestandard.net/PDF/English.aspx/GB4599-2007.
(Continued)

*Primary Examiner* — Thomas M Sember
(74) *Attorney, Agent, or Firm* — Volpe Koenig

(57) ABSTRACT

A low-beam primary optical element for a vehicle lamp, a vehicle lamp module comprising the low-beam primary optical element, a vehicle lamp, and a vehicle. The low-beam primary optical element comprises light entrance portion, a light passage portion and a light exit portion which are sequentially arranged from back to front. The light exit portion comprises a main light exit surface and a second light exit surface connected to the main light exit surface. A low-beam cutoff line structure is provided at the secondary light exit surface. The secondary light exit surface is configured to refract light emitted to the low-beam cutoff line structure forward and upward. The low-beam primary optical element has a simple structure, and can effectively improve the color of a low-beam light-dark cutoff line and mitigate color dispersion.

20 Claims, 9 Drawing Sheets

(56) References Cited

FOREIGN PATENT DOCUMENTS

| | | | |
|---|---|---|---|
| CN | 208764859 | U | 4/2019 |
| CN | 109973920 | A | 7/2019 |
| CN | 211822200 | U | 10/2020 |
| DE | 102018207063 | A1 | 11/2019 |
| EP | 4027052 | A1 | 7/2022 |
| KR | 1020190036807 | A | 4/2019 |
| WO | 2017185118 | A1 | 11/2017 |
| WO | 2022044078 | A1 | 3/2022 |

OTHER PUBLICATIONS

Extended European Search Report issued on May 17, 2023 for European Patent Application No. 21771866.

* cited by examiner

LOW-BEAM PRIMARY OPTICAL ELEMENT, VEHICLE LAMP MODULE, VEHICLE LAMP, AND VEHICLE

CROSS REFERENCE TO RELATED APPLICATIONS

This application us a 35 U.S.C. § 371 national stage of International Application No. PCT/CN2021/075608, which was filed Feb. 5, 2021 and claims the benefit of the Chinese patent application 202010202394.4, filed on Mar. 20, 2020, both of which are incorporated herein by reference as if fully set forth.

FIELD OF THE INVENTION

The present disclosure relates to a vehicle lamp, in particular to a low-beam primary optical element. In addition, the present disclosure further relates to a vehicle lamp module including the low-beam primary optical element, a vehicle lamp and a vehicle.

BACKGROUND OF THE INVENTION

A light distribution pattern, projected onto a vertical light distribution screen at the position 25 m away from the front of the vehicle, of illumination light of an existing vehicle is divided into a low-beam illumination light shape and a high-beam illumination light shape, the low-beam illumination light shape is formed by a low-beam module in a vehicle lamp module, a low-beam primary optical element (such as a reflector or a light guide) and a secondary optical element (such as a lens) are usually arranged in the low-beam module, light emitted by a low-beam light source sequentially passes through the low-beam primary optical element and the secondary optical element to form a low-beam illumination light shape, while light emitted to a low-beam light-dark cutoff line structure at the lower edge of the low-beam primary optical element forms a low-beam light-dark cutoff line in the low-beam illumination light shape.

However, in the prior art, most of light passing through the low-beam cutoff line structure of the low-beam primary optical element enters the secondary optical element from the lower part of the secondary optical element (lens), and a low-beam light-dark cutoff line formed after refraction of the light by the secondary optical element is slightly blue, the color dispersion is serious, and discomfort of a driver in the driving process can be caused.

Based on the above reasons, it is difficult to effectively guarantee that the low-beam cutoff line of the low-beam illumination light shape is ideal in color and the color dispersion is not serious in the prior art.

SUMMARY OF THE INVENTION

The problem to be solved by a first aspect of the present disclosure is to provide a low-beam primary optical element which is simple in structure and capable of effectively improving the color of a low-beam light-dark cutoff line and weakening the color dispersion.

In addition, the problem to be solved by a second aspect of the present disclosure is to provide a vehicle lamp module, the low-beam primary optical element of the vehicle lamp module is simple in structure, and is capable of effectively improving the color of a low-beam light-dark cutoff line and weakening the color dispersion.

Furthermore, the problem to be solved by a third aspect of the present disclosure is to provide a vehicle lamp, the low-beam primary optical element of the vehicle lamp is simple in structure, and is capable of effectively improving the color of a low-beam light-dark cutoff line and weakening the color dispersion.

Furthermore, the problem to be solved by a fourth aspect of the present disclosure is to provide a vehicle, the color of a low-beam light-dark cutoff line of a low-beam illumination light shape of the vehicle is ideal, and the color dispersion is not obvious.

In order to solve the technical problems, one aspect of the present disclosure provides a low-beam primary optical element, which includes a light entrance portion, a light passage portion and a light exit portion which are sequentially arranged from back to front, wherein the light exit portion includes a main light exit surface and a secondary light exit surface connected to the main light exit surface, a low-beam cutoff line structure is provided at the secondary light exit surface, and the secondary light exit surface is configured to refract light emitted to the low-beam cutoff line structure forward and upward.

As a preferable embodiment, the light passage portion includes a plurality of light guide channels, and the light entrance portion is formed into a plane; or the light passage portion is formed into one light guide channel, the light entrance portion is of a light condensation cup structure or a protrusion structure or a cone structure protruding backward, and a light entrance end of the light condensation cup structure is a plane, or a groove is formed at the back part of the light condensation cup structure and is internally provided with a curved surface protruding backward.

More preferably, a transition surface is arranged between the main light exit surface and the secondary light exit surface, and the transition surface is configured to smoothly connect the main light exit surface with the secondary light exit surface.

Furthermore, the transition surface is an arc surface.

As another preferable embodiment, a lower surface of the light passage portion and the secondary light exit surface intersect to form the low-beam cutoff line structure.

As a specific structural form, the secondary light exit surface is gradually inclined backward and downward from top to bottom.

Furthermore, specifically, the left side and the right side of the light passage portion are integrally connected with mounting portions.

As another specific structural form, an included angle θ is formed between the main light exit surface and the secondary light exit surface, and the value range of the included angle θ is $100° \leq \theta < 180°$.

More specifically, the value range of the included angle θ is that $120° \leq \theta < 160°$.

Further specifically, the included angle $\theta = 150°$.

A second aspect of the present disclosure provides a vehicle lamp module which includes light sources, the low-beam primary optical element according to any one of the technical solutions, and a secondary optical element which are sequentially arranged from back to front, wherein the light sources are in one-to-one correspondence to the light entrance portions, an included angle γ is formed between a light entrance portion optical axis of the low-beam primary optical element and the optical axis of the secondary optical element optical, and the low-beam primary optical element is gradually inclined forward and downward from back to front along the light entrance portion optical axis.

As a specific embodiment, the included angle γ≥5°.

More specifically, the included angle γ≥15°.

Further specifically, the included angle γ=20°.

As another specific embodiment, the low-beam cutoff line structure is arranged in an area 2 mm above and below a optical axis of the secondary optical element optical.

A third aspect of the present disclosure provides a vehicle lamp which includes the vehicle lamp module according to any one of the technical solutions.

A fourth aspect of the present disclosure provides a vehicle which includes the vehicle lamp module in the above technical solution.

According to the technical solution, the low-beam primary optical element provided by the present disclosure includes a light entrance portion, a light passage portion and a light exit portion which are sequentially arranged from back to front, the light exit portion includes a main light exit surface and a secondary light exit surface connected to the main light exit surface, a low-beam cutoff line structure is provided at the secondary light exit surface, and the secondary light exit surface is configured to refract light emitted to the low-beam cutoff line structure forward and upward. The light exit portion of the low-beam primary optical element provided by the present disclosure includes the main light exit surface and the secondary light exit surface, the low-beam cutoff line structure is provided at the secondary light exit surface, light emitted to the low-beam cutoff line structure is deflected upward and then emitted into the secondary optical element through the secondary light exit surface, so that the light can be prevented from being emitted from the lower half part of the secondary optical element to the greatest extent, in this way, the color of the formed low-beam light-dark cutoff line is improved, the color dispersion is weakened, and the visual perception of a driver can be improved.

Other advantages of the present disclosure and the technical effects of the preferable embodiments will be further described in the following specific embodiments.

| Description of reference signs: | |
|---|---|
| 1 low-beam primary optical element | 101 light entrance portion |
| 102 light passage portion | 1021 lower surface |
| 103 light exit portion | 1031 main light exit surface |
| 1032 secondary light exit surface | 1033 transition surface |
| 104 mounting portion | 105 low-beam cutoff line structure |
| 2 secondary optical element | 3 light entrance portion optical axis |
| 4 optical axis of secondary optical element | 5 main light exit surface curved surface |
| 6 secondary light exit surface curved surface | 7 low-beam light-dark cutoff line |

DETAILED DESCRIPTION OF THE EMBODIMENTS

The specific embodiments of the present disclosure will be described below in detail in conjunction with the accompanying drawings, and it should be understood that the specific embodiments described herein are only used for describing and explaining the present disclosure, and the protection scope of the present disclosure is not limited to the following specific embodiments.

In the description of the present disclosure, the orientation or position relationship indicated by the terms “front”, “back”, “left”, “right”, “upper” and “lower” is based on the orientation or position relationship indicated by the orientation of the vehicle in a normal traveling state after a low-beam primary optical element or a vehicle lamp module provided by the present disclosure is mounted on the vehicle. Specifically, the end where a secondary optical element 2 is located is the front, the end where a light entrance portion 101 is located is the back, and relative to the front-back direction, the left-right direction of the low-beam primary optical element 1 is the left-right direction, and the up-down direction of the low-beam primary optical element 1 is the up-down direction when viewed from back to front.

Figure 3:
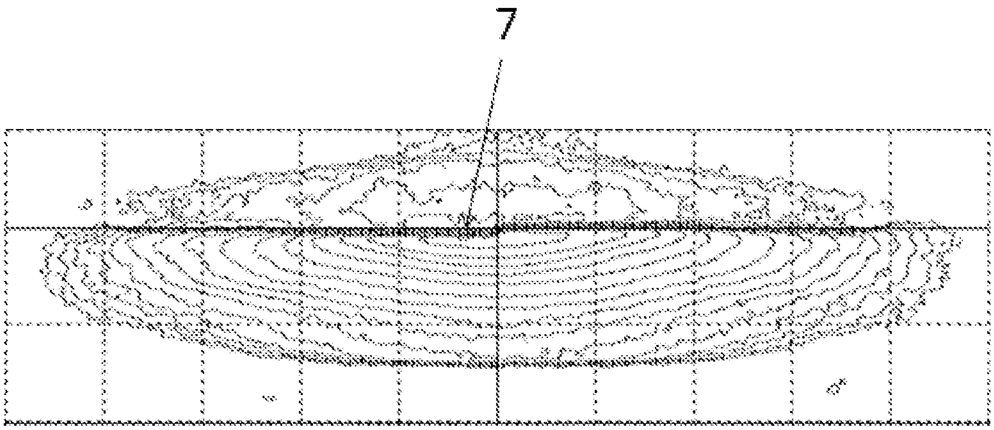
FIG. 3 is a simulation schematic diagram of a low-beam light shape of a vehicle lamp.

According to the definition of GB 4599-2007-Motor Vehicle Headlamps Equipped with Filament Lamps, a light-dark cutoff line is a boundary of visually sensed obvious change of light and dark when a light beam is projected onto a light distribution screen, in the description of the present disclosure, it needs to be explained that the “low-beam light-dark cutoff line” is a general term in the art and is an upper boundary of a low-beam illumination light shape, and the shape of the low-beam light-dark cutoff line 7 will vary according to regulations of different countries. FIG. 3 shows a shape of the low-beam light-dark cutoff line 7.

In the description of the present disclosure, it should be noted that, unless otherwise expressly specified and defined, the terms “mounting” and “connection” should be understood in a broad sense, for example, connection may be fixed connection, detachable connection, or integrated connection; connection may be direct connection or indirect connection through an intermediate medium, and connection may be the internal communication between two elements or the interaction relationship between the two elements. For those skilled in the art, the specific meanings of the terms in the present disclosure can be understood according to specific conditions.

As shown in FIG. 4 to FIG. 11, one aspect of the present disclosure provides a low-beam primary optical element, which includes a light entrance portion 101, a light passage portion 102 and a light exit portion 103 which are sequentially arranged from back to front, wherein the light exit portion 103 includes a main light exit surface 1031 and a secondary light exit surface 1032 connected to the main light exit surface 1031, a low-beam cutoff line structure 105 is provided at the secondary light exit surface 1032, and the secondary light exit surface 1032 is configured to refract light emitted to the low-beam cutoff line structure 105 forward and upward.

Figure 1:
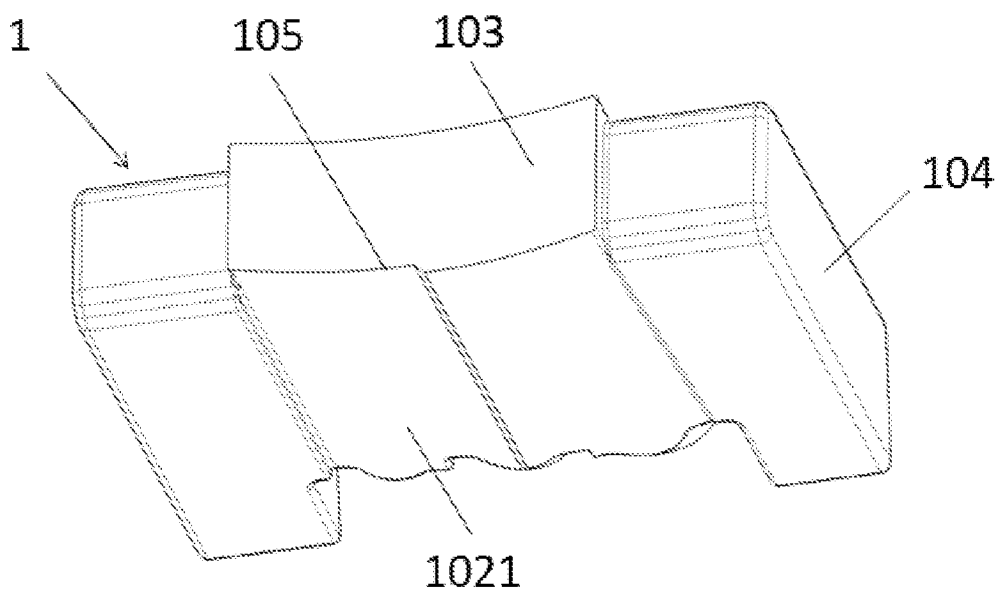
FIG. 1 is a structural schematic diagram of a specific embodiment of a low-beam primary optical element in the prior art.
Figure 2:
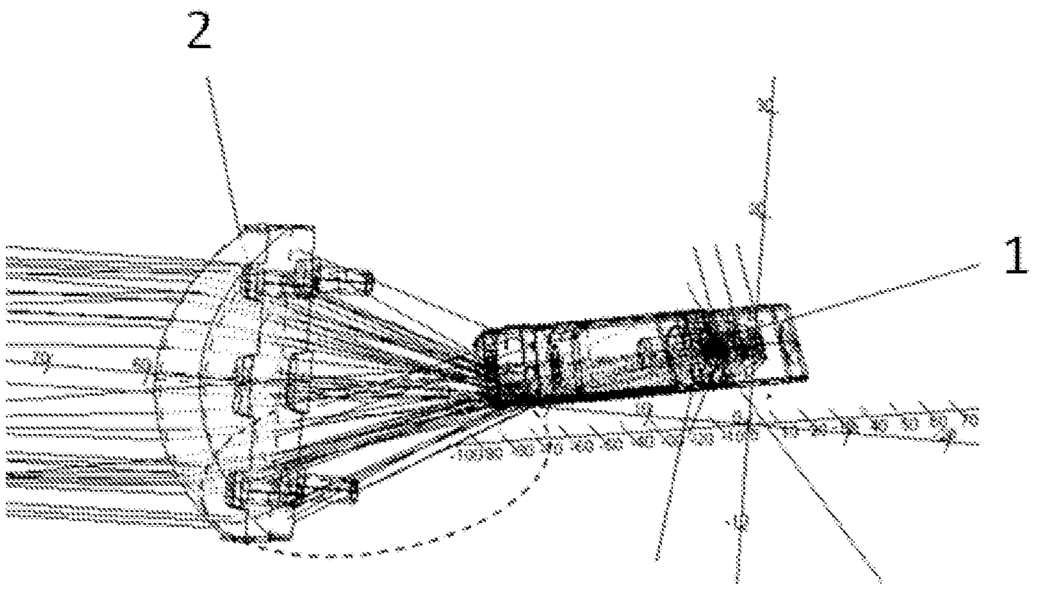
FIG. 2 is a light path diagram of a vehicle lamp module in the prior art.

It can be seen from FIG. 1 that, a light exit portion 103 of a low-beam primary optical element 1 in the prior art is a continuous and smooth curved surface, a low-beam cutoff line structure 105 matched with a low-beam light-dark cutoff line 7 in shape is formed on the lower edge of the light exit portion 103, after being intercepted by the low-beam cutoff line structure 105, light is projected by a secondary optical element 2 to form a low-beam illumination light shape with the low-beam light-dark cutoff line 7. It can be seen from FIG. 2 that, in a vehicle lamp module including the low-beam primary optical element 1 in the prior art, most of the light (namely light in a dotted box in the figure) passing through the low-beam cutoff line structure 105 of the low-beam primary optical element 1 enters the secondary optical element 2 from the lower part of the secondary optical element 2, and forms the low-beam light-dark cutoff line 7 after being refracted by the secondary optical element 2, the color of the low-beam light-dark cutoff line 7 is slightly blue, and color dispersion is serious, which will cause discomfort of a driver in the vehicle traveling process.

Figure 5:
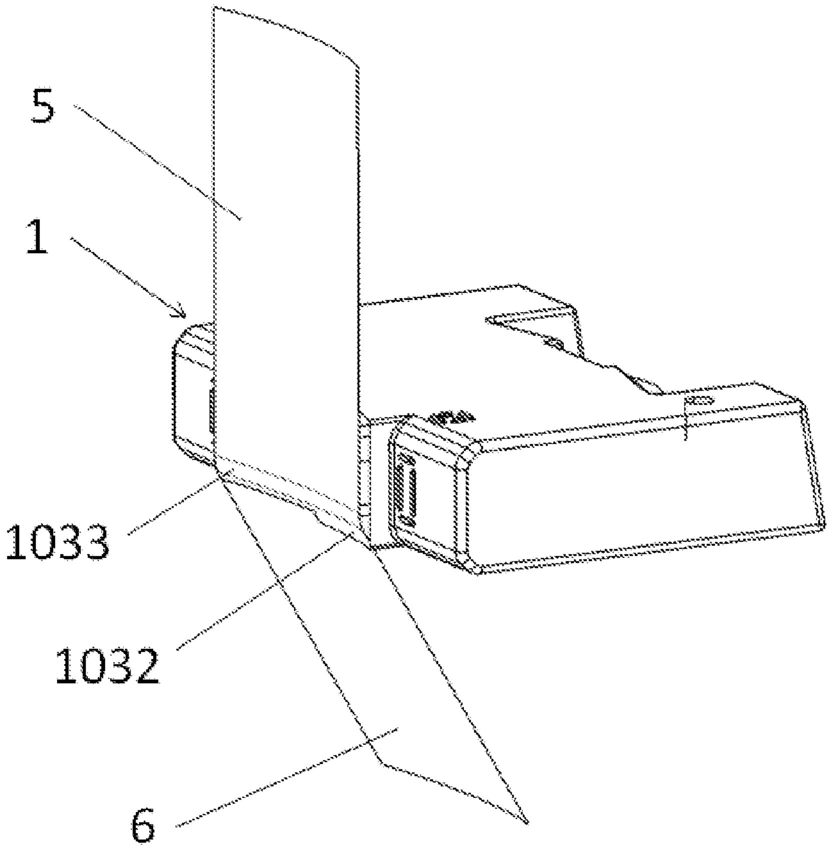
FIG. 5 is a second structural schematic diagram of a low-beam primary optical element in a specific embodiment of the present disclosure.
Figure 6:
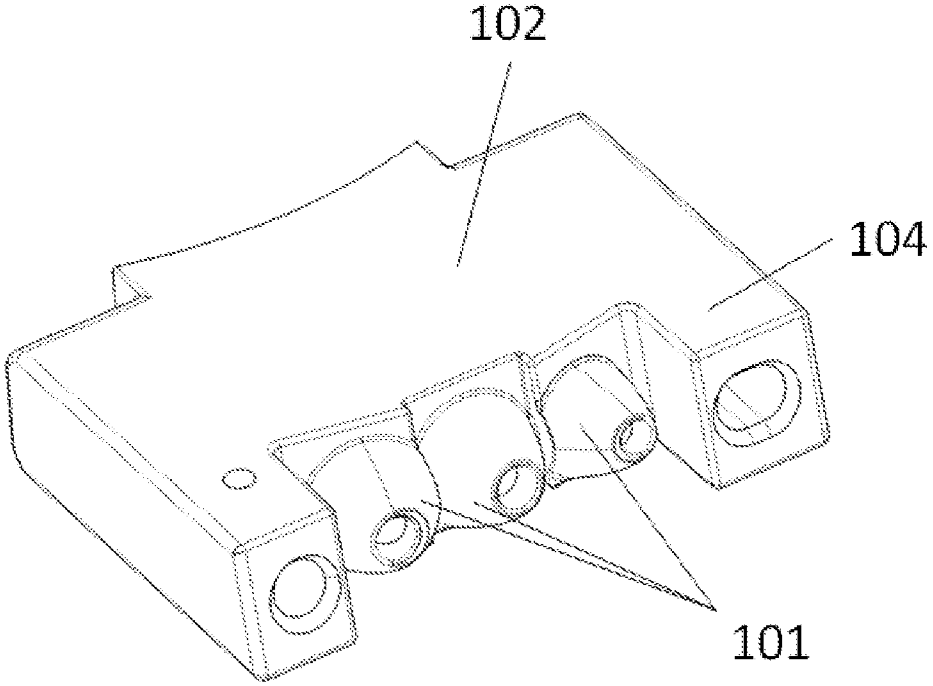
FIG. 6 is a third structural schematic diagram of a low-beam primary optical element in a specific embodiment of the present disclosure.
Figure 7:
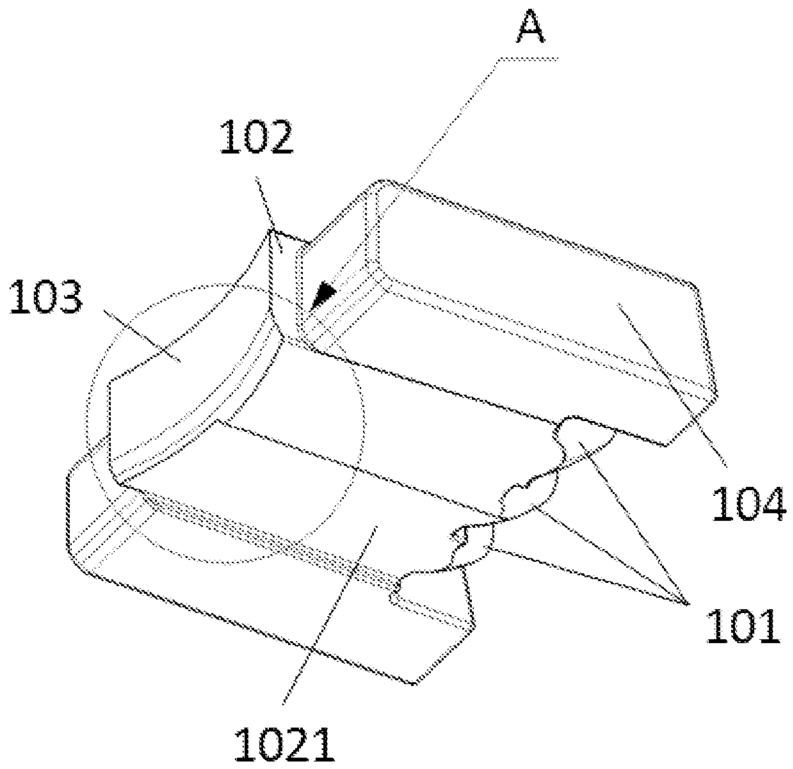
FIG. 7 is a fourth structural schematic diagram of a low-beam primary optical element in a specific embodiment of the present disclosure.
Figure 18:
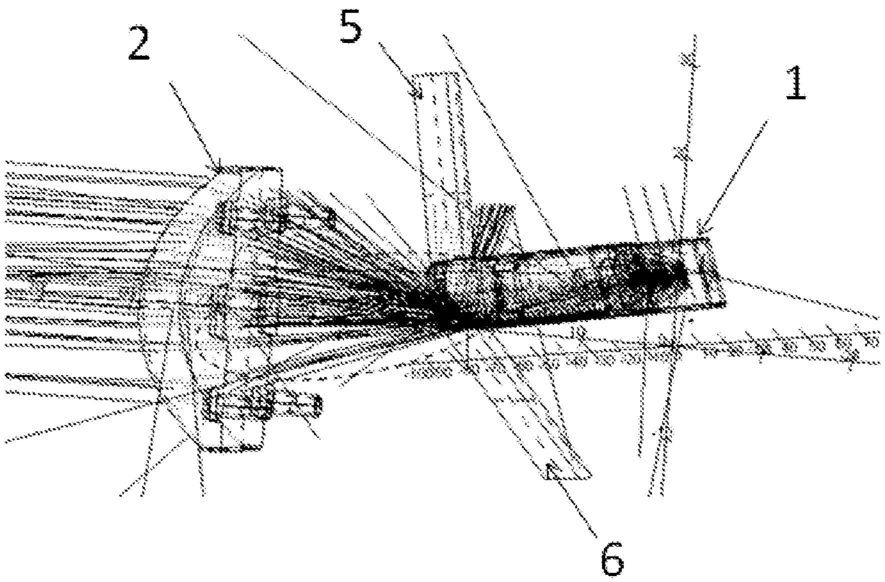
FIG. 18 is a light path diagram of a vehicle lamp module in a specific embodiment of the present disclosure.

It can be seen from FIG. 5 that, the main light exit surface 1031 of the low-beam primary optical element provided by the present disclosure is arranged on a main light exit surface curved surface 5, the secondary light exit surface 1032 of the low-beam primary optical element provided by the present disclosure is arranged on a secondary light exit surface curved surface 6, the main light exit surface curved surface 5 and the secondary light exit surface curved surface 6 are not parallel, a transition surface 1033 is formed at the intersection of the main light exit surface curved surface 5 and the secondary light exit surface curved surface 6, namely, the transition surface 1033 is formed between the main light exit surface 1031 and the secondary light exit surface 1032, the transition surface 1033 is preferably an arc surface, and can smoothly connect the main light exit surface 1031 with the secondary light exit surface 1032. After light passes through the secondary light exit surface 1032 and the low-beam cutoff line structure 105 arranged on the secondary light exit surface 1032, the trend of the light will be shown in FIG. 18, and most of the light (namely light in the dotted box in the figure) passing through the low-beam cutoff line structure 105 can be deflected upward to enter the secondary optical element 2, so that the color of the formed low-beam light-dark cutoff line 7 is white or yellow. The boundary color is improved, so that the visual perception of a driver is improved.

Figure 4:
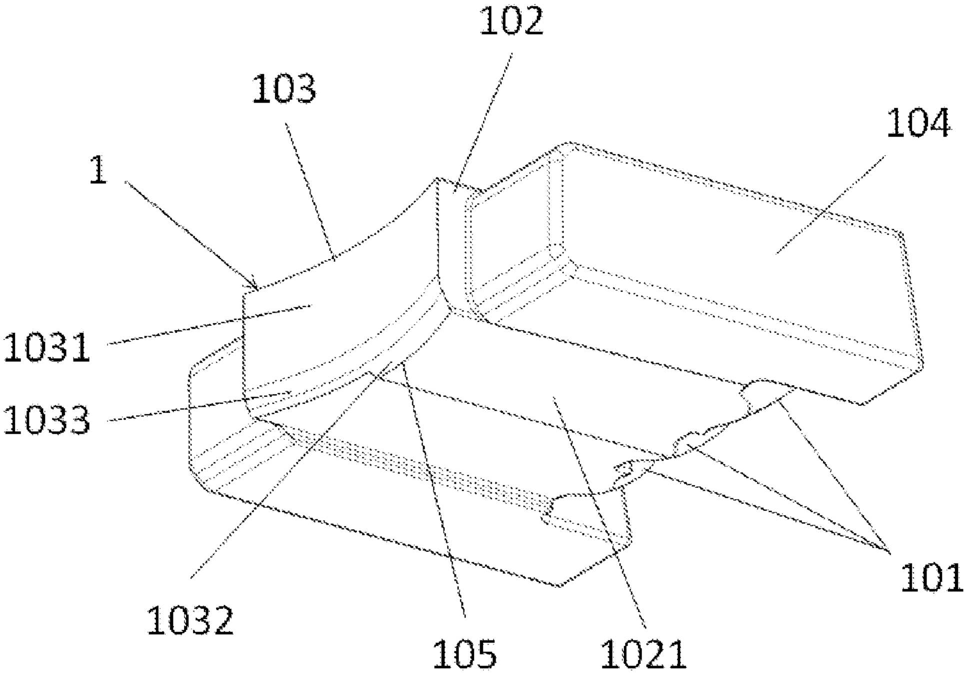
FIG. 4 is a first structural schematic diagram of a low-beam primary optical element in a specific embodiment of the present disclosure.
Figure 8:
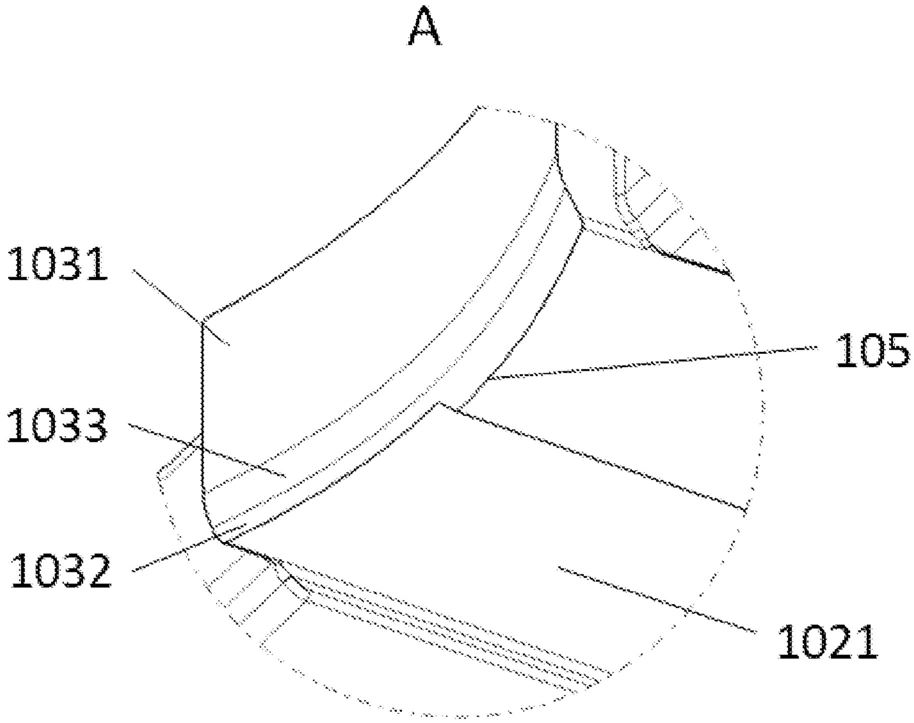
FIG. 8 is a local enlarged view of FIG. 7 in the direction A.
Figure 9:
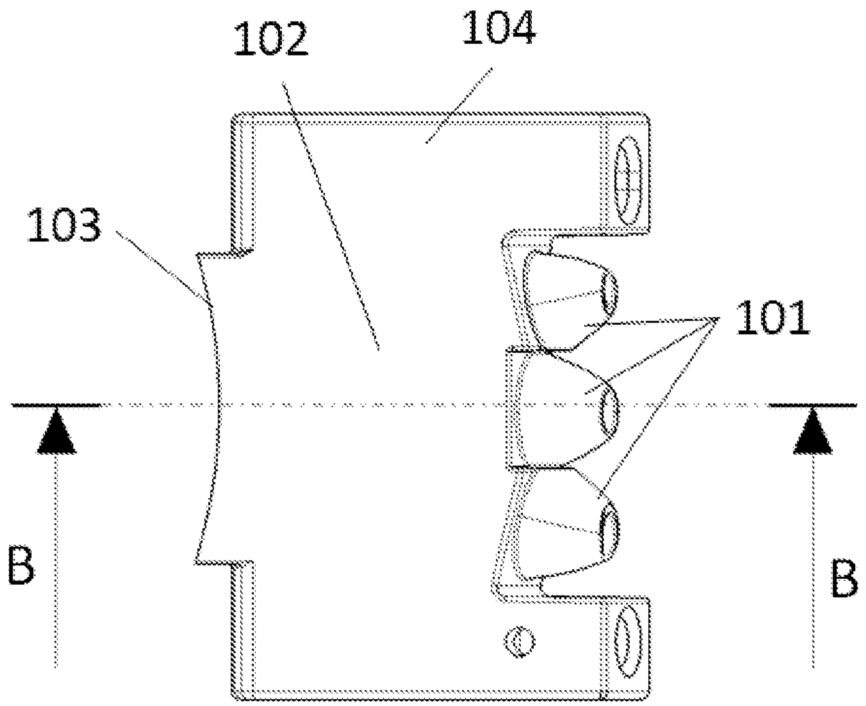
FIG. 9 is a top view of a low-beam primary optical element in a specific embodiment of the present disclosure.
Figure 10:
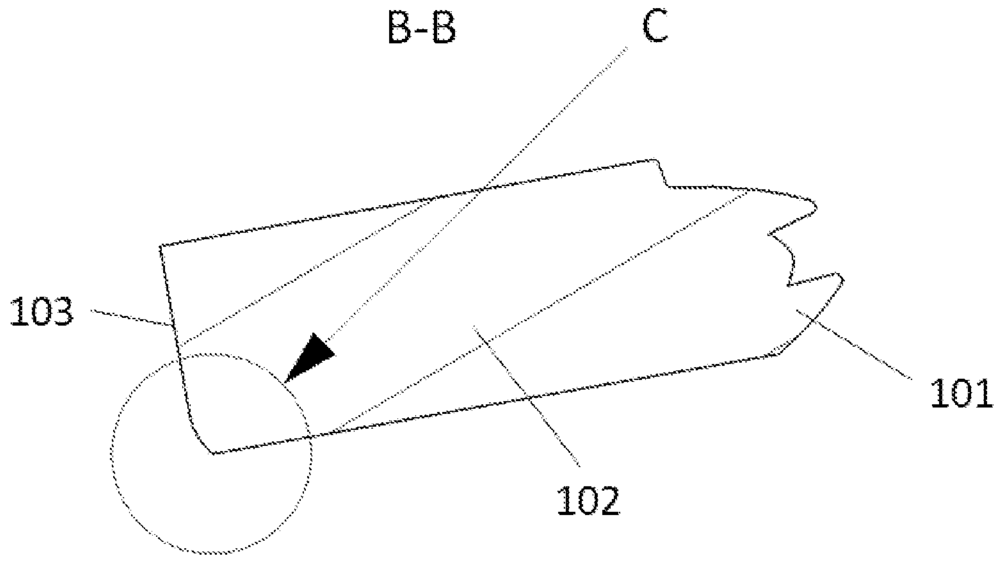
FIG. 10 is a B-B sectional view of FIG. 9.

As shown in FIG. 4 and FIG. 8, a lower surface 1021 of the light passage portion 102 and the secondary light exit surface 1032 intersect to form the low-beam cutoff line structure 105.

Figure 12:
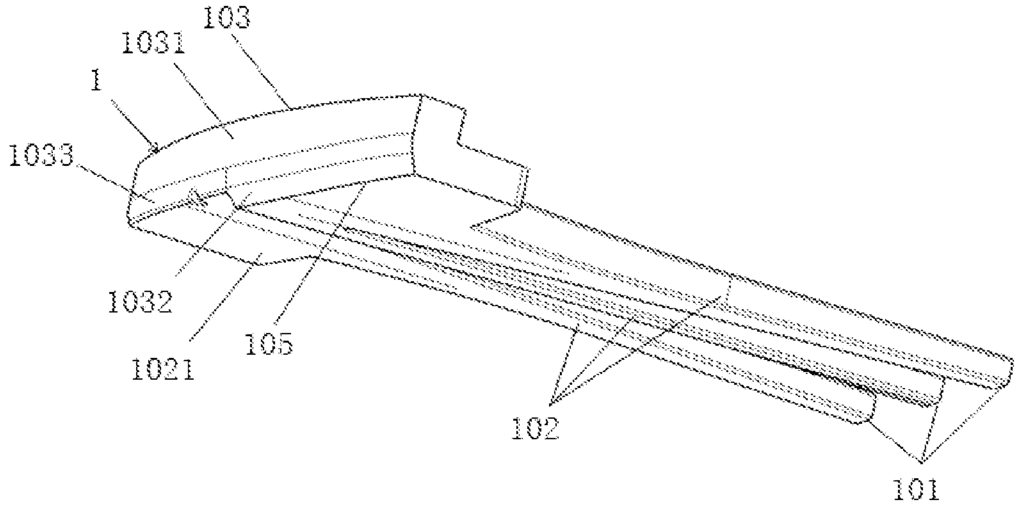
FIG. 12 is a first structural schematic diagram of a low-beam primary optical element in another specific embodiment of the present disclosure.
Figure 13:
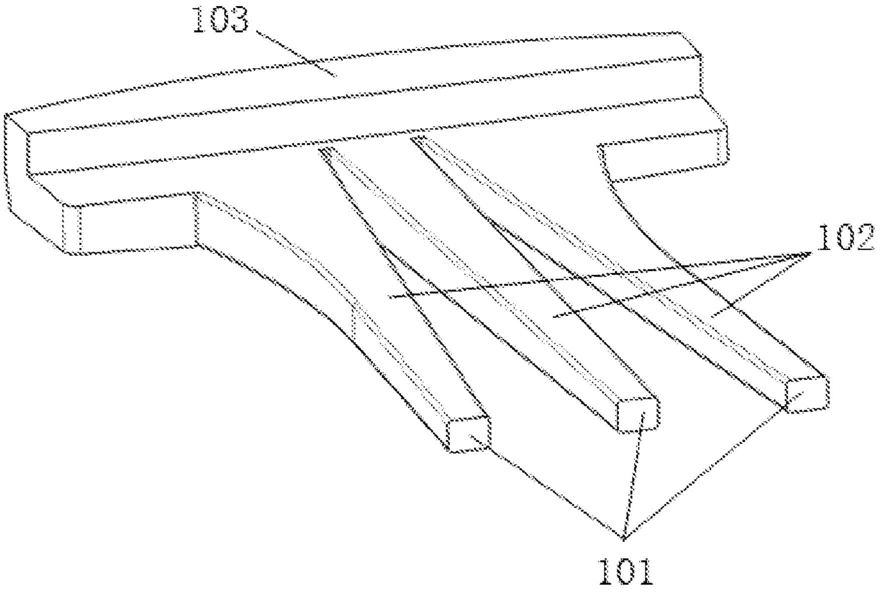
FIG. 13 is a second structural schematic diagram of a low-beam primary optical element in another specific embodiment of the present disclosure.
Figure 14:
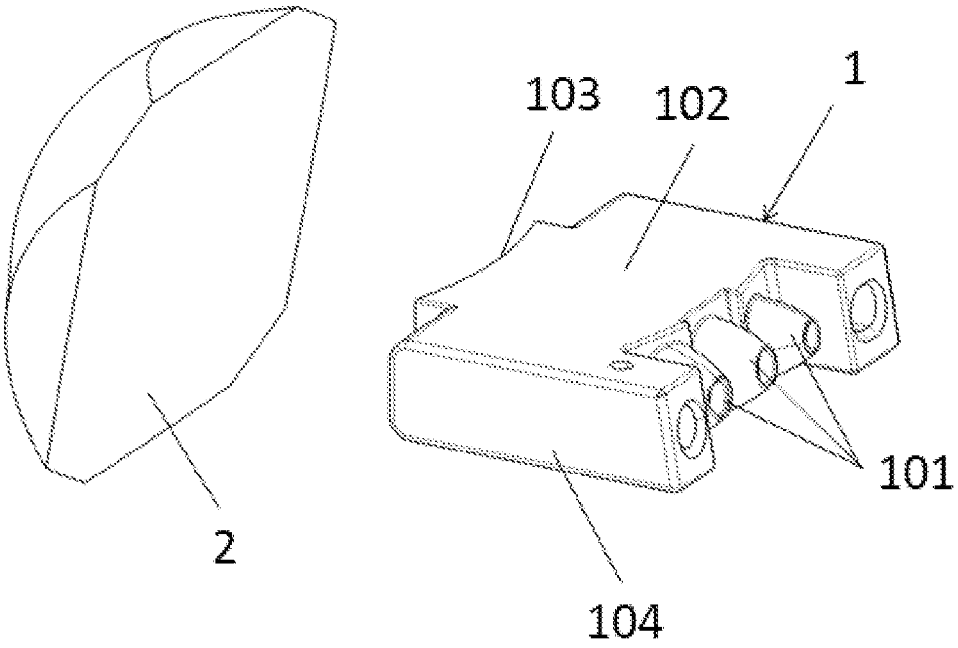
FIG. 14 is a first structural schematic diagram of a vehicle lamp module in a specific embodiment of the present disclosure.

As a preferable structural form, as shown in FIG. 12 and FIG. 13, the light passage portion 102 includes a plurality of light guide channels, and the light entrance portion 101 is formed into a plane, so that the low-beam primary optical element 1 provided by the present disclosure is simpler in structure under the condition of meeting the light exit requirements.

Optionally, the light passage portion 102 is formed into one light guide channel, the light entrance portion 101 is of a light condensation cup structure or a protrusion or cone structure protruding backward, the light entrance end of the light condensation cup structure is a plane, or a groove is formed at the back part of the light condensation cup structure and is provided with a curved surface protruding backward.

The light entrance portion 101 provided by the present disclosure provides two optional structural forms, one is a light condensation cup structure, the other is a protrusion or cone structure protruding backward, and the two structures are both used for condensing and collimating light so as to improve the light utilization rate. However, the light entrance portion 101 provided by the present disclosure is not limited to the two structures and may also be of other structures, and all the structures are used for gathering and collimating the light and emitting the light into the light passage portion 102, so that other light entrance structures with the light gathering function also belong to the protection scope of the present disclosure.

As another preferable structural form, the secondary light exit surface 1032 is gradually inclined backward and downward from top to bottom.

Figure 11:
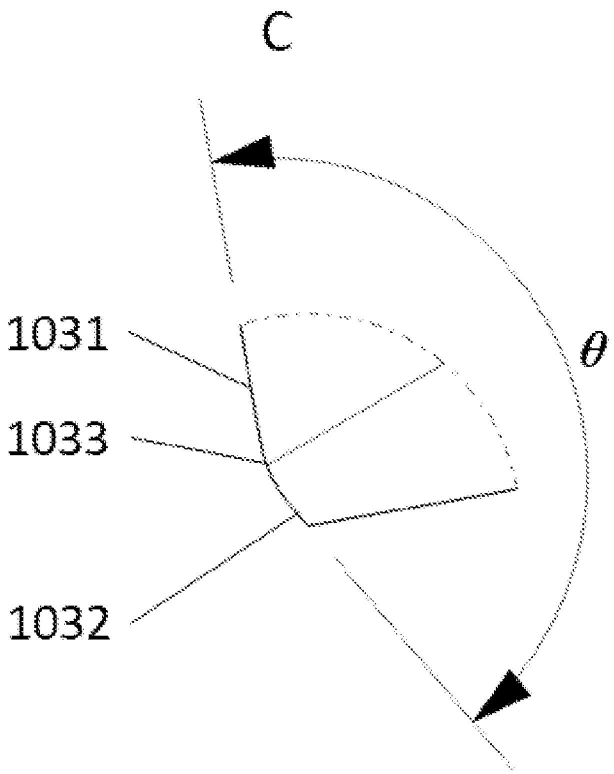
FIG. 11 is a local enlarged view of FIG. 10 in the direction C.

As shown in FIG. 11, the secondary light exit surface 1032 is gradually inclined backward and downward from top to bottom, so that it can be guaranteed that light passing through the low-beam cutoff line structure 105 can be inclined forward and upward to enter the secondary optical element 2.

It needs to be explained here that the main light exit surface 1031 is a curved surface recessed backward, and the secondary optical element 2 is preferably a lens, so that the main light exit surface 1031 can be adapted to the focal plane of the lens, and the vehicle lamp is clearly imaged.

Further preferably, the left side and the right side of the light passage portion 102 are integrally connected with mounting portions 104 which are used for positioning and mounting the low-beam primary optical element 1.

As a specific embodiment, an included angle $\theta$ is formed between the main light exit surface 1031 and the secondary light exit surface 1032, and the value range of the included angle $\theta$ is $100° \leq \theta < 180°$.

Preferably, the value range of the included angle $\theta$ is $120° \leq \theta < 160°$.

More preferably, the included angle $\theta = 150°$.

It can be seen from the local enlarged view in FIG. 11 that the secondary light exit surface 1032 is inclined backward and downward relative to the main light exit surface 1031, the purpose of this setting is to incline light emitted to the low-beam cutoff line structure 105 forward and upward and then emit the light into the secondary optical element 2, and to prevent the light from being emitted to the lower part of the secondary optical element 2 as much as possible, so as to weaken the color dispersion and improve the visual perception of a driver. Here, the secondary light exit surface 1032 is inclined backward and downward relative to the main light exit surface 1031, so that an included angle θ is formed between the secondary light exit surface 1032 and the main light exit surface 1031, and through detection, the value range of the included angle θ is that 100°≤θ<180°, preferably, the value range of the included angle θ is that 120°≤θ<160°, and more preferably, the value range of the included angle θ is that θ=150°.

It can be seen from FIG. 14 to FIG. 18 that, another aspect of the present disclosure provides a vehicle lamp module, which includes light sources (not shown in the figure), the low-beam primary optical element 1 according to any one of the technical solutions, and a secondary optical element 2 which are sequentially arranged from back to front, wherein the light sources are in one-to-one correspondence to the light entrance portions 101, an included angle γ is formed between a light entrance portion optical axis 3 of the light entrance portion 101 and a optical axis 4 of the secondary optical element 2, and the low-beam primary optical element 1 is gradually inclined forward and downward from back to front along the primary optical element optical axis 3.

It should be explained here that the optical axis 4 of the secondary optical element optical 2 is a virtual straight line extending in the front-back direction of the secondary optical element 2 and passing through the focal point of the secondary optical element 2. The light entrance portion optical axis 3 is a virtual straight line extending in the front-back direction of the light entrance portion 101 and passing through the focal point of the light entrance portion 101.

Figure 15:
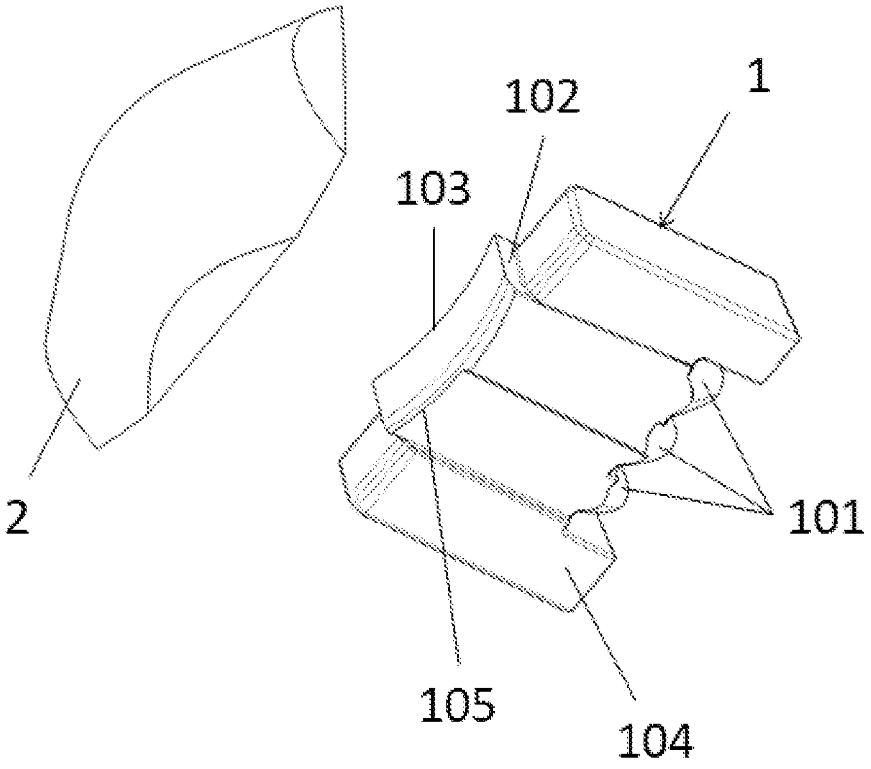
FIG. 15 is a second structural schematic diagram of a vehicle lamp module in a specific embodiment of the present disclosure.
Figure 16:
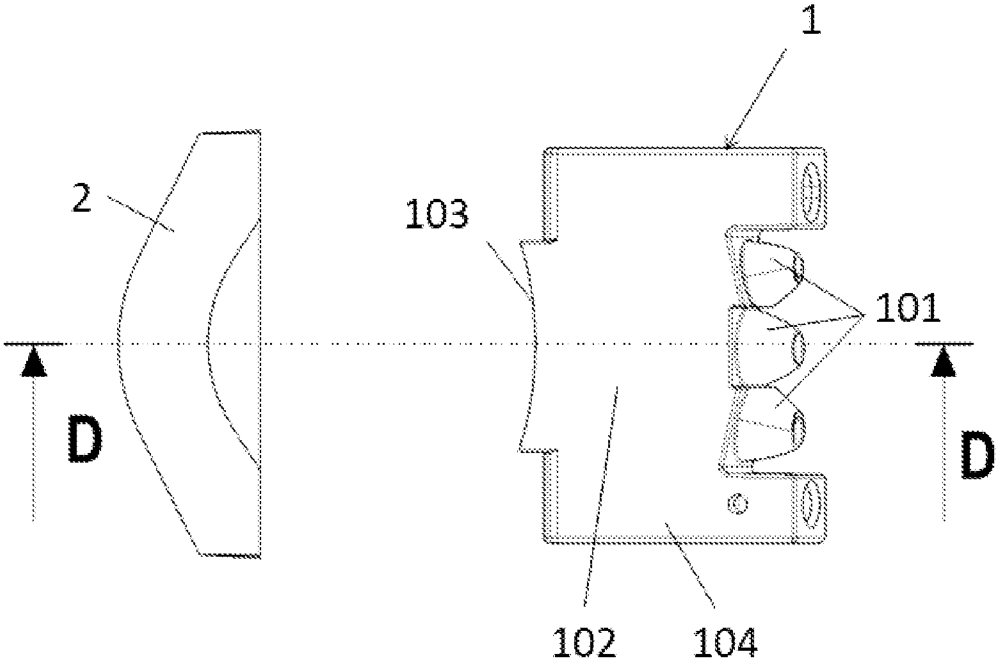
FIG. 16 is a top view of a vehicle lamp module in a specific embodiment of the present disclosure.
Figure 17:
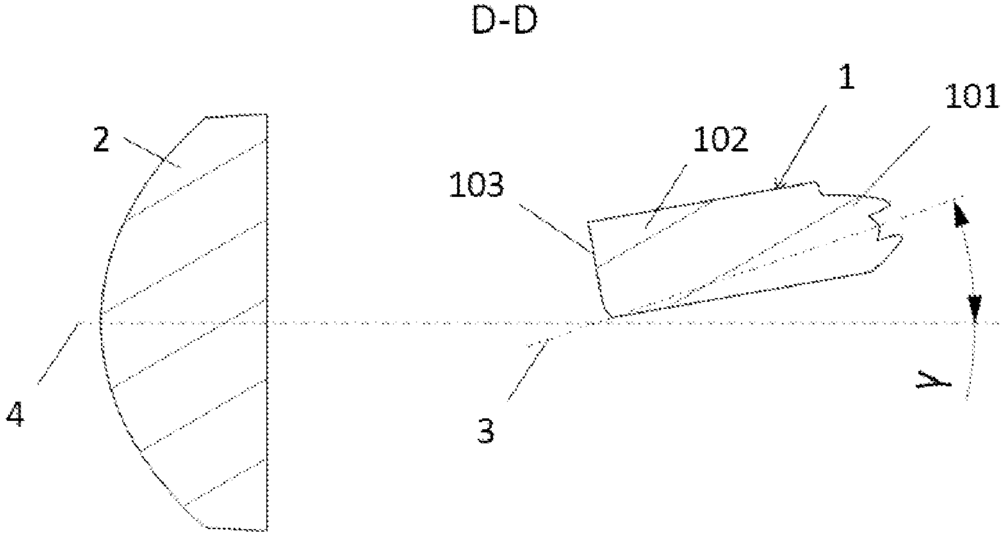
FIG. 17 is a D-D sectional view of FIG. 16.

It can be seen from FIG. 14 to FIG. 18 that, the vehicle lamp module includes the light sources, the low-beam primary optical element 1 and the secondary optical element 2 which are sequentially arranged from back to front, the light sources are in one-to-one correspondence to the light entrance portions 101, and it can be seen from FIG. 15 that, an included angle γ is formed between the light entrance portion optical axis 3 and the optical axis 4 of the secondary optical element optical 2, and at the moment, the low-beam primary optical element 1 is inclined forward and downward, so that light exiting from the secondary light exit surface 1032 can be upward deflected to the secondary optical element 2 as much as possible, and is prevented from being emitted from the lower part of the secondary optical element 2 to the greatest extent.

As a specific structural form, the included angle γ≥5°.

More specifically, the included angle γ≥15°.

Furthermore, the included angle γ=20°.

Therefore, by taking the front-back direction passing through the focus of the secondary optical element 2 as a reference, an included angle γ is formed between the light entrance portion optical axis 3 and the optical axis 4 of the secondary optical element optical 2, the included angle γ≥5°, preferably the included angle γ≥15°, more preferably, the included angle γ=20°, and the included angle γ ensures that the low-beam primary optical element 1 is low in front and high in back in the up-down direction; the low-beam cutoff line structure 105 is provided at the optical axis 4 of the secondary optical element optical 2.

As another specific structural form, the low-beam cutoff line structure 105 is arranged in an area 2 mm above and below the optical axis 4 of the secondary optical element optical 2 according to the light distribution requirements.

A third aspect of the present disclosure further provides a vehicle lamp which includes the vehicle lamp module according to any one of the technical solutions.

A fourth aspect of the present disclosure further provides a vehicle which includes the vehicle lamp according to the technical solution.

It can be seen from the above description that, the low-beam primary optical element 1 provided by the present disclosure includes a light entrance portion 101, a light passage portion 102 and a light exit portion 103 which are sequentially arranged from back to front, the light exit portion 103 includes a main light exit surface 1031 and a secondary light exit surface 1032 connected to the main light exit surface 1031, a low-beam cutoff line structure 105 is provided at the secondary light exit surface 1032, and the secondary light exit surface 1032 is configured to refract light emitted to the low-beam cutoff line structure 105 forward and upward. The light exit portion 103 of the low-beam primary optical element 1 provided by the present disclosure includes the main light exit surface 1031 and the secondary light exit surface 1032, the low-beam cutoff line structure 105 is provided at the secondary light exit surface 1032, light emitted to the low-beam cutoff line structure 105 is deflected upward and then emitted into the secondary optical element 2 through the secondary light exit surface 1032, so that the light can be prevented from being emitted from the lower half part of the secondary optical element 2 to the greatest extent, in this way, the color of the formed low-beam light-dark cutoff line 7 is improved, the color dispersion is weakened, and the visual perception of a driver can be improved.

The preferable embodiments of the present disclosure have been described in detail in combination with the accompanying drawings, however, the present disclosure is not limited to the specific details in the embodiments, within the scope of the technical concept of the present disclosure, various simple variations may be made to the technical solutions of the present disclosure, and these simple variations all belong to the protection scope of the present disclosure.

In addition, it needs to be explained that all the specific technical features described in the specific embodiments may be combined in any appropriate mode under the non-conflict condition, and in order to avoid unnecessary repetition, all possible combination modes of the present disclosure will not be explained any more.

In addition, various different embodiments of the present disclosure may also be combined arbitrarily, and as long as they do not violate the idea of the present disclosure, they should also be regarded as the content disclosed by the present disclosure.

The invention claimed is:

1. A low-beam primary optical element, comprising a light entrance portion, a light passage portion and a light exit portion which are sequentially arranged from back to front, wherein the light exit portion comprises a main light exit surface and a secondary light exit surface connected to the main light exit surface, a lower surface of the light passage portion and the secondary light exit surface intersect to form a low-beam cutoff line structure, and the secondary light exit surface is configured to refract light emitted to the low-beam cutoff line structure forward and upward.

2. The low-beam primary optical element according to claim 1, wherein the light passage portion comprises a plurality of light guide channels, and the light entrance portion is formed into a plane; or the light passage portion is formed into one light guide channel, the light entrance portion is of a light condensation cup structure or a protrusion structure or a cone structure protruding backward, and a light entrance end of the light condensation cup structure is a plane, or a groove is formed at a back part of the light condensation cup structure and is internally provided with a curved surface protruding backward.

3. The low-beam primary optical element according to claim 1, wherein a transition surface is arranged between the main light exit surface and the secondary light exit surface, and the transition surface is configured to smoothly connect the main light exit surface with the secondary light exit surface.

4. The low-beam primary optical element according to claim 3, wherein the transition surface is an arc surface.

5. The low-beam primary optical element according to claim 1, wherein the secondary light exit surface is gradually inclined backward and downward from top to bottom.

6. The low-beam primary optical element according to claim 1, wherein the left side and the right side of the light passage portion are integrally connected with mounting portions.

7. The low-beam primary optical element according to any one of claim 1, wherein an included angle θ is formed between the main light exit surface and the secondary light exit surface, and the value range of the included angle θ is $100° \leq \theta < 180°$.

8. A vehicle lamp module, comprising light sources, the low-beam primary optical element according to claim 1, and a secondary optical element which are sequentially arranged from back to front, wherein the light sources are in one-to-one correspondence to the light entrance portions, an included angle γ is formed between a light entrance portion optical axis of the low-beam primary optical element and the optical axis of the secondary optical element, and the low-beam primary optical element is gradually inclined forward and downward from back to front along the light entrance portion optical axis.

9. The vehicle lamp module according to claim 8, wherein the included angle $\gamma \geq 5°$.

10. The vehicle lamp module according to claim 8, wherein the low-beam cutoff line structure is arranged in an area 2 mm above and below the optical axis of the secondary optical element optical.

11. A vehicle lamp, comprising the vehicle lamp module according to any one of claim 8.

12. The vehicle lamp according to claim 11, wherein the low-beam cutoff line structure is arranged in an area 2 mm above and below the optical axis of the secondary optical element optical.

13. The vehicle lamp according to claim 11, wherein the light passage portion comprises a plurality of light guide channels, and the light entrance portion is formed into a plane; or the light passage portion is formed into one light guide channel, the light entrance portion is of a light condensation cup structure or a protrusion structure or a cone structure protruding backward, and a light entrance end of the light condensation cup structure is a plane, or a groove is formed at a back part of the light condensation cup structure and is internally provided with a curved surface protruding backward.

14. The vehicle lamp according to claim 11, wherein a transition surface is arranged between the main light exit surface and the secondary light exit surface, and the transition surface is configured to smoothly connect the main light exit surface with the secondary light exit surface, and a lower surface of the light passage portion and the secondary light exit surface intersect to form the low-beam cutoff line structure.

15. The vehicle lamp according to claim 11, wherein the secondary light exit surface is gradually inclined backward and downward from top to bottom.

16. The vehicle lamp according to claim 11, wherein the left side and the right side of the light passage portion are integrally connected with mounting portions.

17. The vehicle lamp module according to claim 8, wherein the light passage portion comprises a plurality of light guide channels, and the light entrance portion is formed into a plane; or the light passage portion is formed into one light guide channel, the light entrance portion is of a light condensation cup structure or a protrusion structure or a cone structure protruding backward, and a light entrance end of the light condensation cup structure is a plane, or a groove is formed at a back part of the light condensation cup structure and is internally provided with a curved surface protruding backward.

18. The vehicle lamp module according to claim 8, wherein a transition surface is arranged between the main light exit surface and the secondary light exit surface, and the transition surface is configured to smoothly connect the main light exit surface with the secondary light exit surface, and a lower surface of the light passage portion and the secondary light exit surface intersect to form the low-beam cutoff line structure.

19. The vehicle lamp module according to claim 8, wherein the secondary light exit surface is gradually inclined backward and downward from top to bottom.

20. The vehicle lamp module according to claim 8, wherein the left side and the right side of the light passage portion are integrally connected with mounting portions.

* * * * *